(12) United States Patent
Eckert (10) Patent No.: US 7,512,714 B2
(45) Date of Patent: Mar. 31, 2009

(54) SYSTEM AND METHOD FOR TRANSMITTING ACARS MESSAGES OVER A TCP/IP DATA COMMUNICATION LINK

(75) Inventor: Richard J. Eckert, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 945 days.

(21) Appl. No.: 10/931,489

(22) Filed: Aug. 31, 2004

(65) Prior Publication Data

US 2006/0080451 A1  Apr. 13, 2006

(51) Int. Cl.
*G06F 15/16* (2006.01)
(52) U.S. Cl. .................. 709/246; 455/431; 709/230
(58) Field of Classification Search ................ 709/230, 709/236–237, 246; 455/431
See application file for complete search history.

(56) References Cited

U.S. PATENT DOCUMENTS

| | | | |
|---|---|---|---|
| 5,224,098 A | 6/1993 | Bird et al. | |
| 5,894,557 A | 4/1999 | Bade et al. | |
| 6,161,097 A | 12/2000 | Glass et al. | |
| 6,229,809 B1 | 5/2001 | Murphy et al. | |
| 6,249,818 B1 | 6/2001 | Sharma | |
| 6,266,701 B1 | 7/2001 | Sridhar et al. | |
| 6,278,965 B1 | 8/2001 | Glass et al. | |
| 6,418,128 B1 | 7/2002 | Takagi et al. | |
| 6,434,156 B1 | 8/2002 | Yeh | |
| 6,529,706 B1 | 3/2003 | Mitchell | |
| 6,542,740 B1 | 4/2003 | Olgaard et al. | |
| 6,546,425 B1 | 4/2003 | Hanson et al. | |
| 6,604,030 B1 | 8/2003 | Davis et al. | |
| 6,621,420 B1 | 9/2003 | Poursartip | |
| 6,631,416 B2 | 10/2003 | Bendinelli et al. | |
| 6,677,888 B2 | 1/2004 | Roy | |
| 2002/0032006 A1* | 3/2002 | Nair et al. | 455/66 |
| 2005/0181787 A1* | 8/2005 | Judd et al. | 455/431 |
| 2007/0243867 A1* | 10/2007 | Graves et al. | 455/431 |

FOREIGN PATENT DOCUMENTS

WO   WO 2005/081496 A1   9/2005

OTHER PUBLICATIONS

Stephens, Bob. "Aeronautical Telecommunications Using IPv6", NASA Integrated CNS Conference, May 19-22, 2003 Sheraton Barcelo, Annapolis, MD, <http://spacecom.grc.nasa.gov/icnsconf/docs/2003/02_A1/A1-01-Stephens.pdf>, 44 pages.*

(Continued)

*Primary Examiner*—George C Neurauter, Jr.
(74) *Attorney, Agent, or Firm*—Fogg & Powers LLC (57) ABSTRACT

An ACARS messaging system according to the invention is deployed when a TCP/IP subnetwork is available to the aircraft. ACARS messages are encoded into ASN.1 notation and translated to become compliant with the TCP/IP suite of protocols. A wireless subnetwork provides the initial access point to establish the TCP/IP datalink for the ACARS message traffic. The system allows transmission of ACARS messages using low cost and high bandwidth TCP/IP networks in lieu of the private networks that carry conventional ACARS messages.

37 Claims, 8 Drawing Sheets

OTHER PUBLICATIONS

Roy, Aloke. "Secure Aircraft Communications Addressing and Reporting System (ACARS)", IEEE 20th Conference of Digital Avionics Systems, Oct. 2001, Daytona Beach, FL, 11 pages labeled 7.A.2-1 to 7.A.2-11.*

SkySweep Technologies. "SkySweeper Version 2.10 Reference Manual", 2002, 149 pages.*

Oishi, Roy. "Future Applications and the Aeronautical Telecommunication Network", IEEE Proceedings, Aerospace Conference, Mar. 2001, Big Sky, MT, 5 pages labeled 3-1339 to 3-1343.*

Grappel, Ray. "Open System Protocols for Aviation Data Link Applications", IEEE 19th Digital Avionics Systems Conference, Oct. 2000, Philadelphia, PA, 6 pages labeled 7.E.3-1 to 7.E.3-6.*

PCT International Search Report PCT/US2005/030886, Jan. 26, 2006.

Aloke Roy Ed, Secure Aircraft Communications Addressing and Reporting System (ACARS), Institute of Electrical and Electronics Engineers, Oct. 14, 2001, pp. 2-11, vol. 2.

Aircom Datalink ACARS Service—Ground Access, Supplemental to Technical Data Sheet, Jun. 14, 2004, XP002362486, 4 pages, www.sita.aero.

* cited by examiner

SYSTEM AND METHOD FOR TRANSMITTING ACARS MESSAGES OVER A TCP/IP DATA COMMUNICATION LINK

TECHNICAL FIELD

The present invention relates generally to data communication systems. More particularly, the present invention relates to a data communication system for the processing and transmission of Aircraft Communications Addressing and Reporting System ("ACARS") messages using a TCP/IP network.

BACKGROUND

ACARS is an addressable digital data communication system utilized by commercial and business aircraft. ACARS was developed to enable flight operators to communicate with the aircraft in their respective fleets. ACARS is used to transmit routine reports, data, and simple messages between an aircraft and its flight operator. ACARS messages are transmitted using AM channels to avoid overcrowding of the aircraft VHF voice channels. Conventional ACARS messaging is described and defined by the ARINC 618 and ARINC 620 standards.

Currently, ACARS messages traverse legacy datalinks that are expensive and relatively slow, such as VHF channels or SATCOM links. Such communication paths are adequate for communications during flight, but can be undesirable for communications after the aircraft has landed. Historically, even after an aircraft has touched down, ACARS messages must be transmitted via existing systems and protocols, which may be provided by private companies such as ARINC (in the United States) and SITA (in Europe). Since most commercial aircraft communication is handled after touchdown, ACARS messaging can be very expensive for airlines, especially for those with very large fleets.

Accordingly, it would be desirable to have an ACARS messaging system that can take advantage of higher speed and less costly data communication systems available to aircraft after touchdown. For example, it would be advantageous for an ACARS messaging system to leverage existing data communication technologies such as the Internet, TCP/IP based communications, and wireless links such as 802.11 links. Furthermore, other desirable features and characteristics of the invention will become apparent from the subsequent detailed description and the appended claims, taken in conjunction with the accompanying drawings and the foregoing technical field and background.

BRIEF SUMMARY

A system for transmitting ACARS messages after touchdown of an aircraft includes onboard processing logic that translates a conventional ACARS message into a format compatible with the TCP/IP suite of protocols. The translation enables the system to transmit ACARS message content using high speed networks, such as the Internet and the LAN architecture maintained by the airline. The translation also facilitates the transmission of ACARS message content in a manner that bypasses the conventional and costly networks maintained by ARINC and SITA.

The above and other aspects of the invention may be carried out in one form by an ACARS messaging method that involves obtaining an ACARS message containing message content, encoding the ACARS message into ASN.1 format, translating the encoded message into an ACARS-IP message (compliant with TCP/IP) containing the message content, and transmitting the ACARS-IP message between an aircraft and a message processing server via a TCP/IP datalink.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that the present invention may be practiced in conjunction with any number of data transmission protocols and that the system described herein is merely one exemplary application for the invention.

For the sake of brevity, conventional techniques related to ACARS message creation, routing, and processing, TCP/IP data transmission, signaling, network control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

An ACARS messaging system according to the invention is designed to leverage existing TCP/IP network datalinks that are available to an aircraft, thus enabling the aircraft to communicate ACARS message content to a ground-based peer. Briefly, the invention relates to an application protocol and processing performed by the originator and/or destination subsystems that allow ACARS messages to traverse a TCP/IP network such as the Internet. From a user perspective, ACARS message communications appear to be traversing conventional datalinks even though, in reality, the ACARS message content traverses a low cost and high bandwidth commercial network. Notably, ARINC or SITA need not be involved in ACARS traffic handled by the ACARS messaging system (unlike air-to-ground and ground-to-air transactions over SATCOM/VHF), and the ACARS message content can be transferred directly from the aircraft to a ground end system (and vice versa) over the TCP/IP network without any processing provided by a data service provider.

Figure 1:
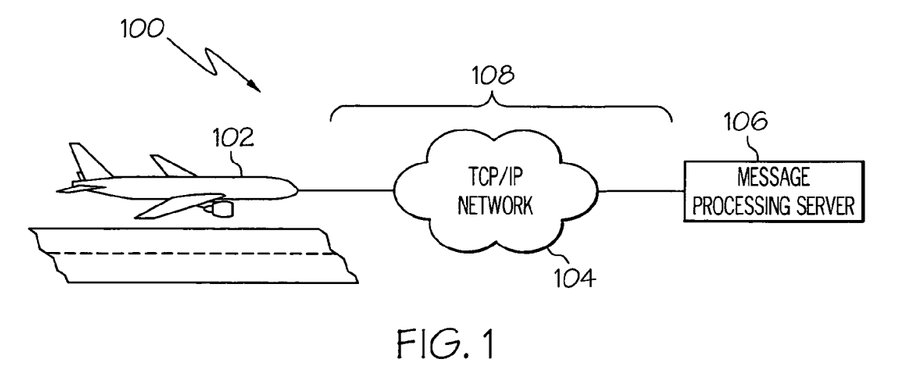
FIG. 1 is a diagram of a system environment for ACARS messaging over IP.

FIG. 1 is a diagram of an ACARS messaging system environment 100 in which a system according to the invention may be deployed. This environment 100 generally includes an aircraft 102, e.g., an aircraft of a commercial airline, that has touched down or is close to touching down. Once it has landed, aircraft 102 can establish communication with a suitable TCP/IP network 104 such as the Internet. In this regard, aircraft 102 preferably includes an onboard data communication element configured to establish the TCP/IP datalink. In the example embodiment of the invention described herein, a message processing server 106 is capable of establishing communication with TCP/IP network 104. In a typical environment 100, message processing server 106 is a ground-based unit located at the destination airport.

In practice, TCP/IP network 104 can include any number of physical datalinks interconnected together for purposes of routing TCP/IP traffic from a data source to a data destination. In this regard, the ACARS messaging system may establish a TCP/IP datalink 108 between aircraft 102 and message processing system 106 to facilitate communication of ACARS message content as described in more detail below. To handle a fleet of aircraft, message processing system 106 is configured to support a plurality of TCP/IP connections (one per aircraft). As used herein, a "TCP/IP datalink" is any communication link that can transport data in compliance with the TCP/IP suite of protocols. TCP/IP datalink 108 can include one or more components, including any number of wireless TCP/IP datalinks and any number of wired TCP/IP datalinks.

Figure 2:
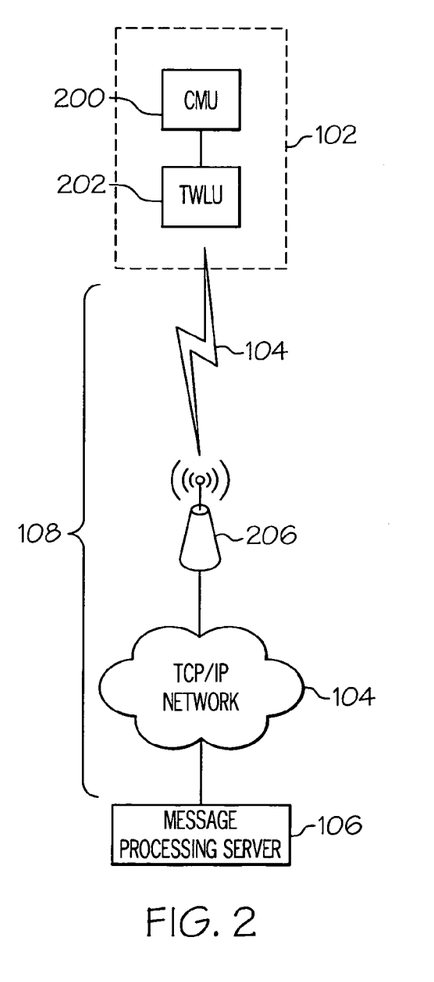
FIG. 2 is a schematic representation of a practical ACARS messaging system deployment over IP.

FIG. 2 is a schematic representation of a practical ACARS messaging system deployment. In FIG. 2, aircraft 102 is schematically depicted by the dashed lines. Aircraft 102 may include an onboard communications management unit ("CMU") 200 and an onboard data communication element, for example, a terminal area wireless LAN unit ("TWLU") 202. In practice, CMU 200 is a line replaceable unit ("LRU") hardware component that includes processing logic that supports a number of aircraft communication functions, including conventional ACARS messaging and the modified ACARS messaging functions described herein. CMU 200 includes at least an ACARS router component that performs ACARS message processing and routing. The ACARS router component also includes a TCP/IP stack and processing logic related to ACARS message encoding and translation. In a practical implementation, the ACARS router component may be realized with one or more physical modules, cards, or devices (where such modules, cards, or devices are suitably configured to communicate with each other and to execute independent tasks to facilitate concurrent processing).

In the example embodiment, CMU 200 is coupled to TWLU 202 with a suitable datalink, e.g., a 10Base-T Ethernet datalink. TWLU 202, which may also be an LRU, includes hardware and processing logic that supports wireless data communication between aircraft 102 and a ground-based system such as the LAN maintained by the destination airport. In a practical embodiment, TWLU 202 establishes a wireless datalink 204 between aircraft 102 and a wireless access point 206 associated with the ground-based network. In the example embodiment, wireless datalink 204 is a TCP/IP datalink. In practice, wireless datalink 204 can be realized as an 802.11 (a, b, or g) datalink, a Bluetooth datalink, a HomeRF datalink, a HiperLAN datalink, GPRS, wireless telephony, UMTS, SATCOM, or the like. For purposes of the commercial aircraft example described herein, wireless access point 206 can be a ground-based unit located at the destination airport. Wireless access point 206 is connected to TCP/IP network 104, thus establishing TCP/IP datalink 108 between aircraft 102 and message processing server 106.

Figure 3:
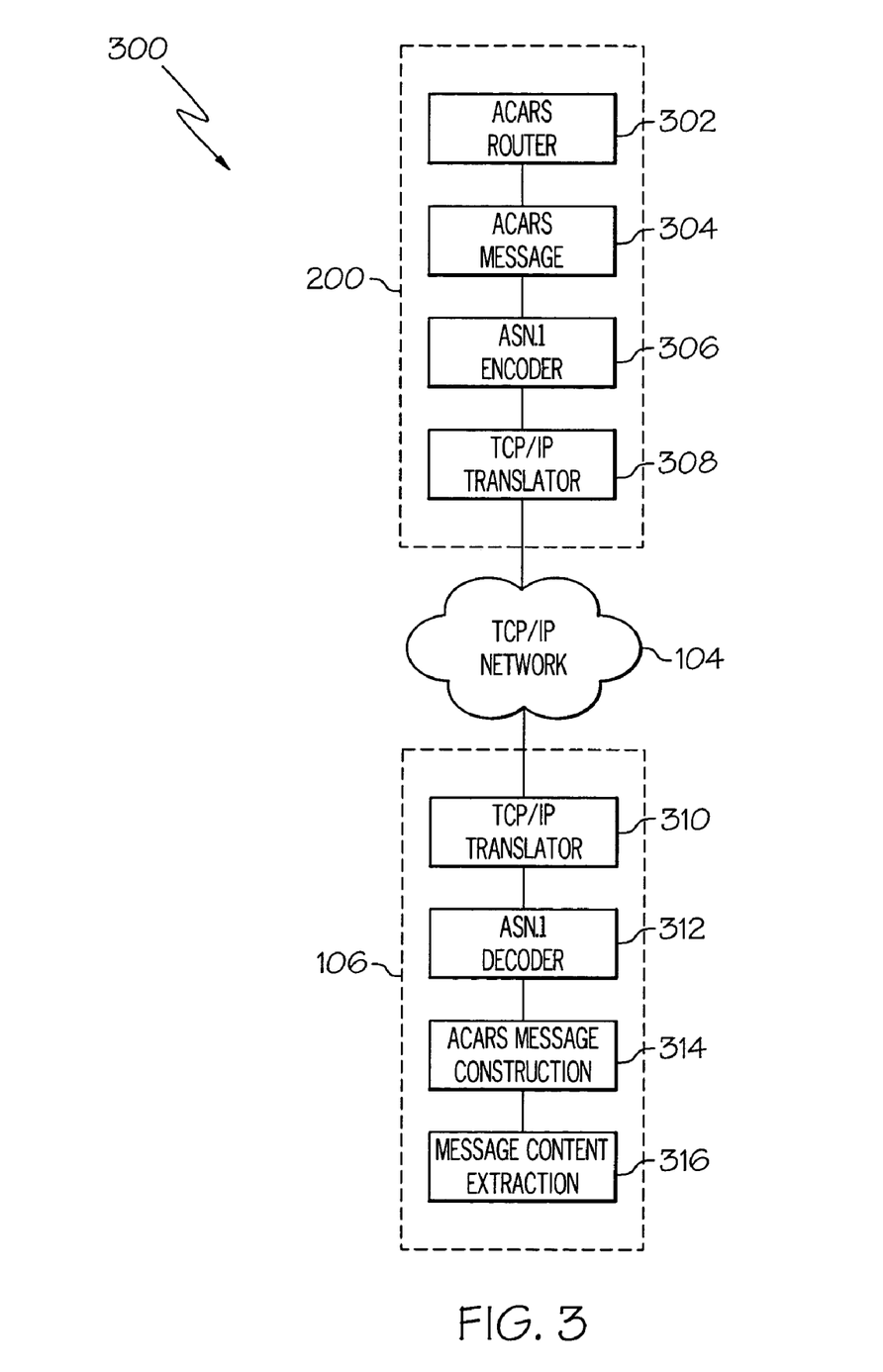
FIG. 3 is a simplified schematic representation of an ACARS messaging system according to the invention.

FIG. 3 is a simplified schematic representation of an ACARS messaging system 300 according to the invention. FIG. 3 depicts functional elements, data elements, and processing logic associated with CMU 200 and message processing server 106. Generally, CMU 200 may include the following elements: an ACARS router 302; ACARS messages 304; an ASN.1 encoder 306; and a TCP/IP translator 308. Generally, message processing server 106 may include the following elements: a TCP/IP translator 310; an ASN.1 decoder 312; ACARS message construction logic 314; and message content extraction logic 316. For simplicity, FIG. 3 is directed to the processing and handling of an ACARS downlink message, i.e., an ACARS message sent from CMU 200 to message processing server 106. In a practical embodiment, ACARS messaging system 300 is configured for bidirectional message communication and, as such, both CMU 200 and message processing server 106 may include functional elements, data elements, and processing logic that supports ACARS uplink messages in the reverse direction.

Referring to CMU 200, ACARS router 302 handles incoming and outgoing ACARS message traffic, including the generation and processing of ACARS messages 304. The configuration and characteristics of conventional ACARS messages are well known to those skilled in the art and, therefore, will not be described in detail herein. Such conventional ACARS messages can include messages that comply with ARINC standards, e.g., A618 messages, A619 messages, and A620 messages. ASN.1 encoder 306 is configured to encode, convert, and/or translate ACARS messages into a format that is compliant with ASN.1. ASN.1 is a formal notation used for describing data transmitted by protocols, regardless of language implementation and physical representation of the data, regardless of the application, and regardless of the complexity of the data. ASN.1 provides an unambiguous methodology for exchanging ACARS content between CMU 200 and message processing server 106. TCP/IP translator 308 functions to translate, convert, and/or format the encoded ACARS messages into corresponding ACARS-IP messages that are compliant with the TCP/IP suite of protocols. The term "ACARS-IP message" is used herein to distinguish such messages from conventional ACARS messages.

As described above, the ACARS-IP messages can be transmitted between the aircraft and message processing server 106 via a suitable TCP/IP datalink, which may include one or more wireless TCP/IP datalinks. Referring to message processing server 106, the ACARS-IP messages are received and processed by TCP/IP translator 310. Translator 310 functions to translate, convert, and/or format the ACARS-IP messages into corresponding data that can be processed by ASN.1 decoder 312. ASN.1 decoder is configured to decode, convert, and/or translate this data to remove the ASN.1 encoding performed by ASN.1 encoder 306. ACARS message construction logic 314 can process the decoded data to construct a received ACARS message having the conventional ACARS format. Thereafter, message content extraction logic 316 can extract any of the useful content from the received ACARS message for further processing or handling in any suitable manner. In lieu of "reconstruction" of the A620 message, the raw data could be fed into any number of processes for appropriate handling.

The example embodiment described herein handles A618, A619, and A620 messages. A618 messages are messages transmitted between aircraft 102 and a ground system such as a data service provider ("DSP"). ACARS messaging system 300 is preferably utilized to transmit A618 messages after touchdown of aircraft 102. Conventional ACARS messaging techniques can be utilized to transmit A618 messages during flight. A619 messages are "internal" messages transmitted between CMU 200 and other LRUs on aircraft 102. A620 messages are messages transmitted between a ground system such as a DSP and an end system (in a practical commercial aircraft deployment, the end system is maintained by the airline).

Figure 4:
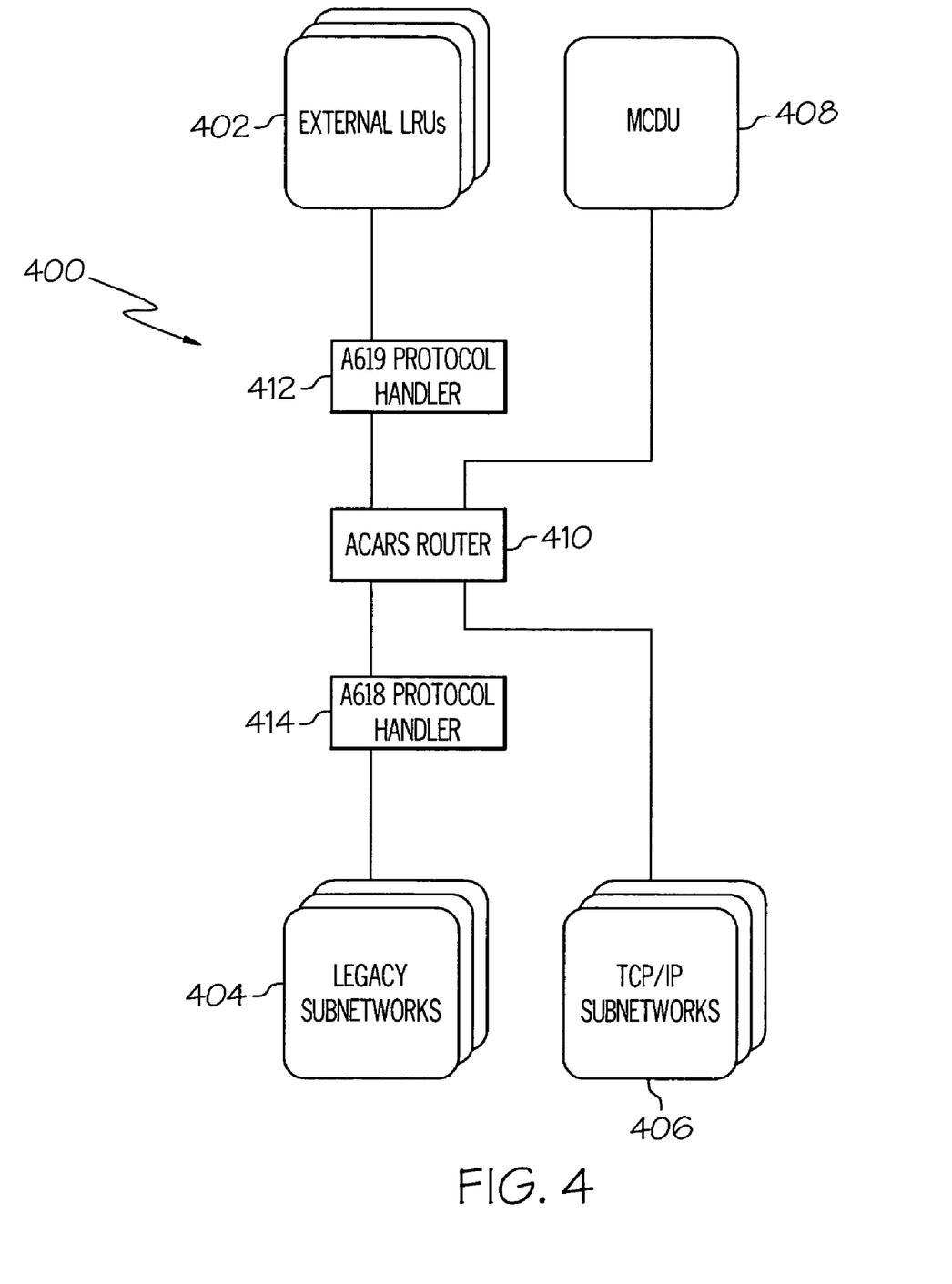
FIG. 4 is a simplified software architecture diagram of a communications management unit that handles ACARS messages.

FIG. 4 is a simplified software architecture diagram of a portion of a CMU 400. CMU 400 is configured to communicate with other external LRUs 402 of aircraft 102, legacy subnetworks 404 that support ACARS messaging, a TCP/IP subnetwork 406 as described herein, and a multifunction control and display unit ("MCDU") 408 that functions as a display and input device in the cockpit of the aircraft. As described above, CMU 400 may contain processing logic related to the encoding and translation of ACARS messages for transmission via TCP/IP subnetwork(s) 406. CMU 400 also includes an ACARS router 410, which handles incoming and outgoing ACARS message traffic, an A619 protocol handler 412 coupled to ACARS router 410, and an A618 protocol handler 414 coupled to ACARS router 410.

A conventional ACARS messaging process may be performed as follows. An LRU 402 communicates with A619 protocol handler 412, which generates a suitable A619 message for processing by ACARS router 410. ACARS router 410 then communicates the message to A618 protocol handler 414, which generates a suitable A618 message. The A618 message is then routed to legacy subnetwork(s) 404. In contrast, an ACARS messaging process according to the invention may be performed as follows. The pilot of an aircraft can enter a message (e.g., by typing into a keyboard) into MCDU 408, which is onboard the aircraft. That message is then communicated to ACARS router 410 in a manner that bypasses A619 protocol handler 412. Similarly, messages sent via TCP/IP subnetwork(s) 406 can bypass A618 protocol handler 414 in transit to ACARS router 410. Therefore, the techniques of the invention can be utilized to avoid conventional A619 and A618 ACARS message processing.

Figure 5:
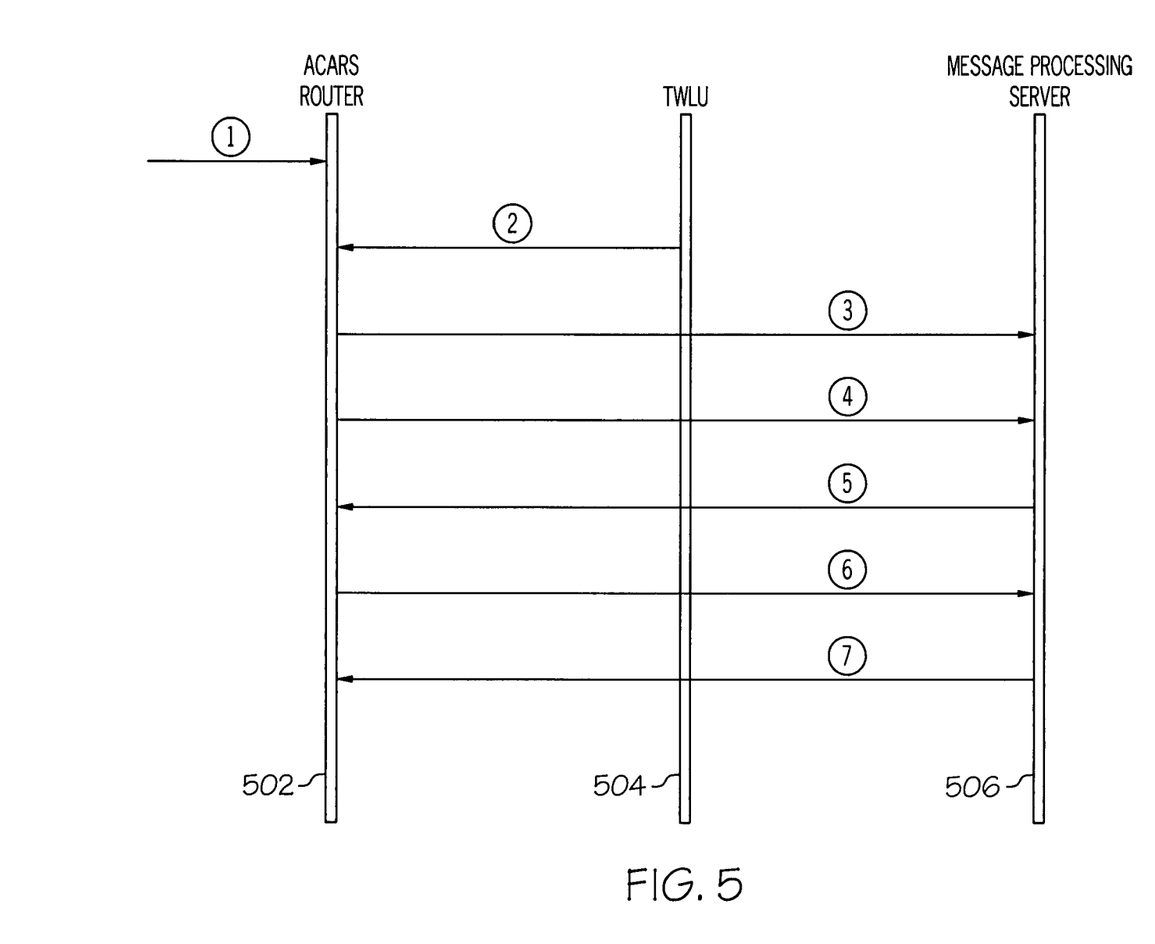
FIG. 5 is a message sequence diagram that depicts an example sequence handled by an ACARS messaging system over IP.
Figure 6A:
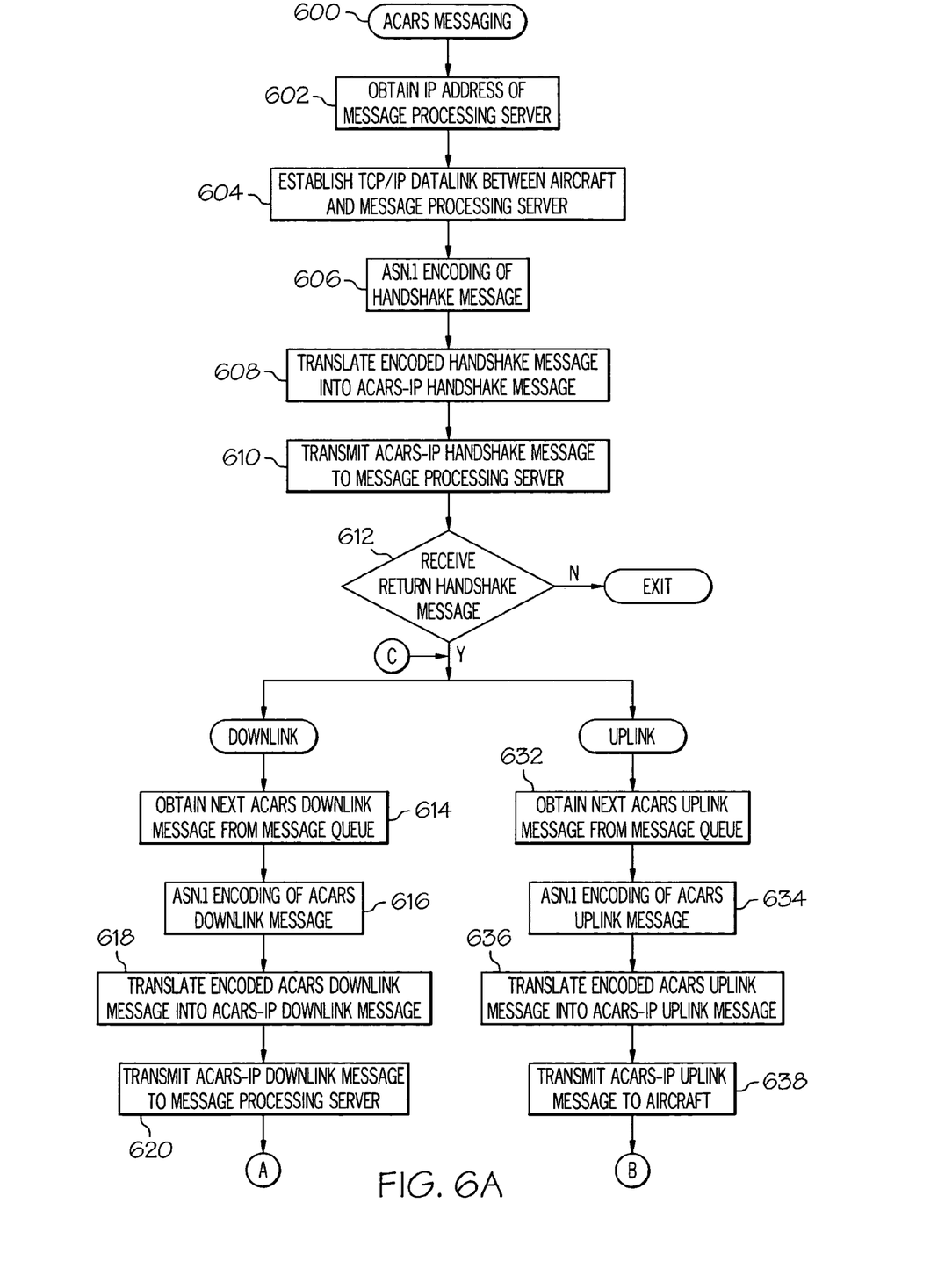
FIG. 6 is a flow diagram of an ACARS messaging process.
Figure 6B:
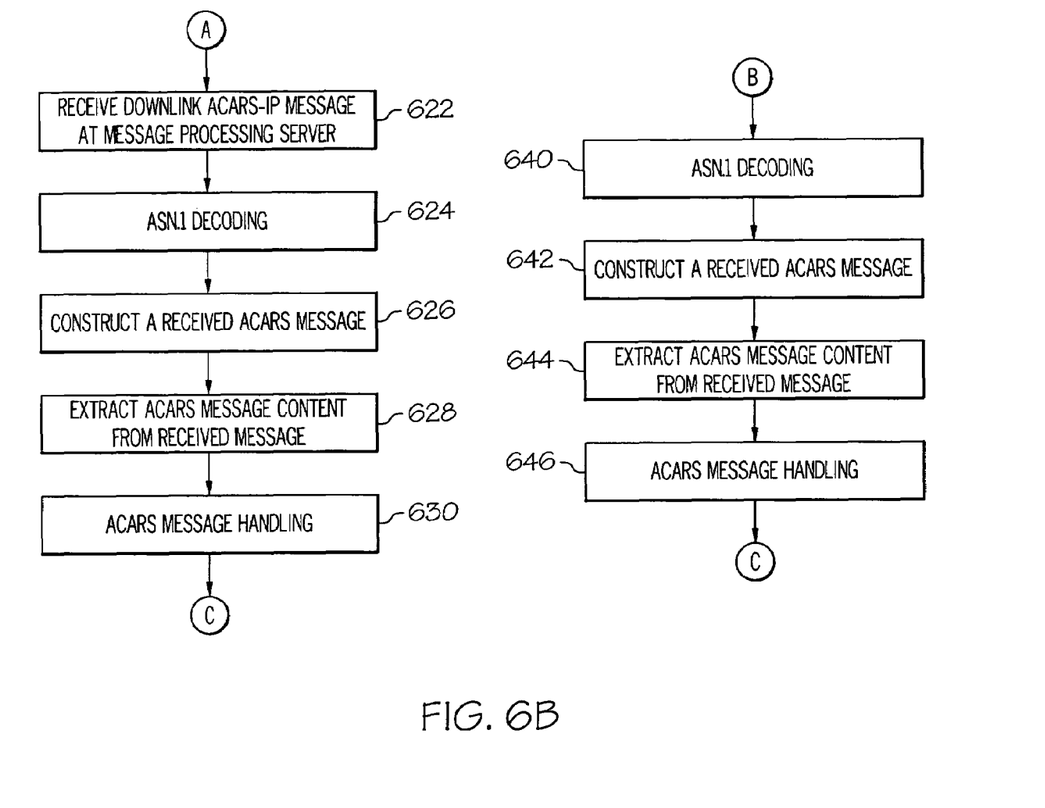

FIG. 5 is a message sequence diagram that depicts an example sequence handled by an ACARS messaging system, and FIG. 6 is a flow diagram of an ACARS messaging process 600. The operation of an ACARS messaging system according to the invention will be described in connection with FIG. 5 and FIG. 6. In FIG. 5, time is represented by the vertical scale, with time progressing from top to bottom. FIG. 5 depicts processing or routing performed by an ACARS router 502, which may be realized in a CMU in a practical embodiment, a TWLU 504, and a message processing server 506. Process 600 and the example message sequence diagram assume the following: (1) the CMU has been initialized and is operational; (2) the aircraft has landed or is otherwise within the vicinity of a wireless access point such that TCP/IP connectivity can be established; (3) the ground-based end system, e.g., a message processing server, is monitoring for a TCP/IP connection from the CMU; and (4) the ground network infrastructure is in place and functioning properly.

Referring to FIG. 5, Item 1 represents any event that triggers the processing of ACARS messages as described herein. The event may represent the touchdown of the aircraft and notification of the touchdown event to ACARS router 502, the availability of a specified amount of message data, the availability of a suitable TCP/IP connection, etc. This event enables ACARS router 502 to prepare to make the TCP/IP network connection. For example, ACARS router 502 may process the ground-based IP address and/or hostname of message processing server 506. Referring to FIG. 6, ACARS messaging process 600 may begin by obtaining the IP address of message processing server (task 602). This IP address is necessary for connectivity to the TCP/IP network. The destination hostnames and IP addresses can be resolved from the aircraft modifiable information ("AMI") stored for the CMU. The TCP/IP port numbers may also be configurable via the AMI, or held constant, depending upon the particular implementation. For a given airline, the IP address of message processing server 506 may vary from one airport to another or remain constant regardless of the airport.

Item 2 represents an indication from TWLU 504 to ACARS router 502 that wireless connectivity at a data link layer level has been established. In other words, networking protocols exercising on the TCP/IP network may now exchange data. At this time, ACARS messaging process 600 can establish a TCP/IP datalink between the aircraft and message processing server 506 (task 604). In this regard, Item 3 of the sequence diagram represents an attempt to create a TCP/IP connection with message processing server 506 at the given IP address. In practical embodiments, the first attempt might fail due to routing information being exchanged and/or due to an unstable wireless datalink, however, multiple attempts can be performed to ensure that a stable connection is established.

ACARS messaging process 600 encodes a handshake message into an ASN.1 compliant handshake message (task 606). In practice, the handshake message contains content including at least an aircraft registration number for the aircraft, which enables message processing server 506 to identify the aircraft. Other information that could be contained in the handshake message includes Tail ID, flight number, and any other data that can help message processing server 506 determine the identity of the originating aircraft or CMU. The encoded handshake message can then be translated or otherwise formatted into an ACARS-IP handshake message that is TCP/IP compliant (task 608); the ACARS-IP handshake message will also contain at least the aircraft registration number. Item 4 of the sequence diagram and task 610 of process 600 both represent the transmission of the ACARS-IP handshake message from the CMU to message processing server 506 over the TCP/IP datalink. The intent of this transmission is to establish a communication session between the CMU and message processing server 506.

In response to the handshake message, message processing server 506 can perform a similar procedure to generate and transmit an ACARS-IP return handshake message. In the example embodiment, the ACARS-IP return handshake message contains a unique token/string identifier that identifies message processing server 506. Item 5 of the sequence diagram represents the transmission of the ACARS-IP return handshake message from message processing server 506 to the CMU. Referring to ACARS messaging process 600, if the CMU does not receive a return handshake message (query task 612), then process 600 can exit or transmit another handshake message. If the return handshake message is received, then process 600 continues; the TCP/IP connection can now be utilized to transmit any number of downlink messages and/or any number of uplink messages between the aircraft and the message processing server 506. Uplink and downlink messages can be transmitted concurrently once the TCP/IP connection has been established. Accordingly, process 600 shows separate subprocesses for downlink and uplink message processing.

Regarding downlink messages, process 600 continues and obtains the next ACARS downlink message from a message queue or other source of ACARS messages (task 614). An ACARS messaging system according to the invention can be configured to take advantage of the low cost TCP/IP network as follows. While the aircraft is still in flight or otherwise incapable of establishing a TCP/IP connection as described herein, conventional ACARS downlink messages can be prioritized according to their importance and/or time sensitivity. In this regard, critical messages and messages that cannot be delayed can be processed and transmitted using conventional ACARS messaging techniques. On the other hand, less important messages and messages that need not be delivered immediately can be prioritized and queued for later transmission as one or more ACARS-IP downlink messages. An onboard message queue, which may be realized as a data storage element, can store the messages for subsequent transmission via the TCP/IP datalink after touchdown.

Once the TCP/IP datalink has been established, ACARS router is notified that the TCP/IP subnetwork is ready for use. At this point, ACARS message traffic can occur, including downlink and uplink messages. The sequence diagram shows an example processing of a downlink message, represented by Item 6 (transmitting a suitably formatted ACARS-IP downlink message to message processing server 506 via the TCP/IP datalink).

Referring back to ACARS messaging process 600, an ACARS downlink message containing message content is preferably encoded into an ASN.1 compliant message containing the message content (task 616). In addition, process 600 translates, converts, or otherwise formats the encoded message into an ACARS-IP downlink message containing the message content (task 618). In the practical embodiment, ACARS router 502 processes and encapsulates the ACARS text message and parameters into an ASN.1 protocol data unit ("PDU") for transmission to message processing server 506 via the TCP/IP datalink (task 620). As mentioned above, the TCP/IP datalink may include one or more wireless datalinks, and task 620 may transmit the ACARS-IP downlink message via the Internet.

The ACARS-IP downlink message is received at message processing server 506 (task 622), which handles the processing of the received message. Briefly, message processing server 506 functions to convert the TCP/IP packets into any suitable format. In one embodiment, message processing server 506 converts the TCP/IP packets into a format that is recognizable by legacy ACARS messaging systems. Alternatively, the raw data could be fed into other processes or systems (e.g., databases, statistical analysis routines, auto-response systems, email, memory devices, etc.) that utilize different formats. In this regard, ACARS messaging process 600 can perform ASN.1 decoding of the received ACARS-IP message (task 624) and construction of a received ACARS message (task 626). Process 600 may construct the received ACARS message such that it again becomes compliant with the conventional ACARS format. Eventually, process 600 extracts the ACARS message content from the received message (task 628) and/or performs ACARS message handling (task 630) in accordance with the needs and requirements of the system.

The sequence diagram also shows an example processing of an uplink message, represented by Item 7. As mentioned above, a practical embodiment may send uplink and downlink messages at any time, and the timing shown in FIG. 5 merely represents a simplified scenario useful for explaining the messaging processes.

For the sake of completeness, ACARS messaging process 600 includes the possibility of concurrent uplink message transmission. Processing of an uplink message may begin by obtaining the next ACARS uplink message from a message queue or from any suitable source associated with message processing server 506 (task 632). Thereafter, process 600 proceeds with encoding the ACARS uplink message into an ASN.1 compliant message (task 634). In addition, process 600 translates, converts, or otherwise formats the encoded message into an ACARS-IP uplink message containing the desired message content (task 636). In the practical embodiment, message processing server 506 creates one or more ASN.1 PDUs during tasks 634 and 636. Thereafter, the ACARS-IP uplink message can be transmitted to the aircraft via the established TCP/IP datalink (task 638).

The ACARS-IP uplink message is eventually received by ACARS router 502, which handles the processing of the received message. Briefly, ACARS router 502 functions to convert the TCP/IP packets into any suitable format. In one embodiment, ACARS router 502 converts the TCP/IP packets into a format that is recognizable by legacy ACARS messaging systems. Alternatively, the raw data could be fed into other processes or systems (e.g., databases, statistical analysis routines, auto-response systems, email, memory devices, etc.) that utilize different formats. In this regard, ACARS messaging process 600 can perform ASN.1 decoding of the received ACARS-IP uplink message (task 640) and construction of a received ACARS uplink message (task 642). Process 600 may construct the received ACARS uplink message such that it again becomes compliant with the conventional ACARS format. Eventually, process 600 extracts the ACARS message content from the received message (task 644) and/or performs ACARS message handling (task 646) in accordance with the needs and requirements of the system. For example, the message, depending upon the destination, may be forwarded to other airborne end systems, such as the flight management system of the aircraft.

After each uplink or downlink message is processed, the next message can be handled as described above. In this regard, FIG. 6 depicts the downlink and uplink branches as loops that facilitate the repeated handling of any number of messages.

EXAMPLE IMPLEMENTATION

The following is a high level design of an example ACARS messaging application protocol that may be utilized in connection with a practical embodiment of the invention. It should be appreciated that this example reflects only one possible practical implementation of the invention and that the invention is not limited to this specific embodiment or any particular implementation. The system design approach on the CMU is to bypass the conventional ACARS stack and to send the ACARS "user-text" directly to the ground end system. The reason for this approach is to bypass unnecessary ACARS processing (ARINC 618/620), alleviate the need for an ACARS air-ground ACK on a per-message basis (which also alleviates the lock-step limitation of the ACARS protocol), and provide the "user-text" in a format that can be understood by any ground end system. Processing by a data service provider on an ARINC or SITA network is unnecessary with this approach.

The intent is to provide the ground end system with enough information to display the message as if it were received from a data service provider in A620 format (see Table 1 below). The ground end system will be responsible for arranging the data for display in A620 format, or the ground end system may display any or all of the information in any format.

A620 Downlink Message Example—An example A620 ACARS downlink message is set forth below. The intent is to provide the information that a ground end system can use to formulate the A620 message and display exactly as shown. In practice, the CMU will not send the ACARS message shown below verbatim to the ground end system. The example downlink message is formatted as follows:

QU ORDOPUA SFOMTUA
.DSPXXXX 182111
DFD
FI UA17/AN N1313Z
DT DSP RGS 182111 D01A
-user-text Decomposition Of Example A620 Message—Table 1 decomposes the example A620 ACARS message and provides an explanation of how all the necessary information may be derived on a ground end system. Column 1, "620 Downlink ACARS Message," defines the field name in the A620 ACARS message. Column 2, "Origin," notes where the information may be derived from. "GND" means the ground end system knows this information a priori. "CMU" means this information will be provided by the CMU during the ACARS messaging protocol exchange described herein. "T-CMU" means information will be translated on the ground from information provided by the CMU (through the use of the ACARS messaging protocol exchange described herein). Column 3, "Description," provides direction for how the information may be populated on the ground. The last column, "Example," maps the information back to the A620 ACARS message example.

TABLE 1

A620 Downlink ACARS Message Fields

| 620 Downlink ACARS Message | Origin | Description | Example |
| --- | --- | --- | --- |
| Priority | GND | Fixed—constant, priority will always be QU | QU |
| Destination Address | GND | Fixed—Always the airline-supplied basic address | ORDOPUA |
| Supplemental Address | GND | Fixed—Supplied by ground (optional) | SFOMTUA |
| Signature (Originator Address of Service Provider) | GND | Fixed—No DSP has been used, therefore the ground system can define this item | .DSPXXXX |
| Transmission Time | CMU | Time ACARS message was sent | 182111 |
| Standard Message Identifier ("SMI") | T-CMU | Translated on ground from label and optional sublabel | DFD |

TABLE 1-continued

A620 Downlink ACARS Message Fields

| 620 Downlink ACARS Message | Origin | Description | Example |
| --- | --- | --- | --- |
| Flight Identifier TEI | GND | Fixed | FI |
| Flight Identifier | CMU | Provided by CMU | UA17 |
| Aircraft Registration Number TEI | GND | Fixed—constant | /AN |
| Aircraft Registration Number | CMU | Provided by CMU | N1313Z |
| Service Information TEI | GND | Fixed—constant | DT |
| Data Service Provider ("DSP") Identifier | GND | Fixed—No DSP has been used, therefore the ground system can define this item | DSP |
| Ground Station | GND | No ground station has been used, therefore the ground system can define this item | RGS |
| Message Reception Time | GND | This is usually the time provided by the DSP. Since no DSP has been used, the ground system can determine this item | 182111 |
| Message Sequence Number | CMU | Provided by CMU | D01A |
| Free Text TEI | GND | Fixed—constant | -<space> |
| Free Text | CMU | Message payload | user-text |

Note that the SMI can be determined on the ground end system by mapping the label and sublabel of the ACARS message to the SMI. This mapping is provided in the ARINC 620-4 specification, Appendix C. In addition, the label and sublabel of the ACARS message will be provided by the CMU (via the ACARS messaging protocol exchange described above).

A620 Downlink Messaging Protocol—The following is a high level composition of PDUs that can be generated by the CMU and sent to the ground.

TABLE 2

"CMU-Hello" PDU

CMU-Hello
Aircraft Registration Number

TABLE 3

"Downlink-ACARS-MSG" PDU

Downlink-ACARS-MSG
Flight Identifier
Message Sequence Number
Transmission Time
Label
Sub-Label
Text ("Text" field from Table 1)

In a practical embodiment, an acknowledgement ("ACK") PDU sent by the CMU for every PDU received from the ground is not necessary due to a reliable transport system (i.e., the TCP/IP connection).

A618 Uplink Message Example—An example of a partial A618 uplink message is set forth below. This message contains all parts after the conventional ACARS message "STX" field. As described above, the ACARS stack in the CMU is bypassed, which eliminates the need for a complete A618 header in the ACARS message. Nonetheless, issues might surface when other end systems (e.g., LRUs such as printers or the flight management system) on the aircraft expect a formatted header. Hence, it is the responsibility of the ground end system to populate the header as described in Table 4 (see below) prior to sending the ACARS message to the CMU. This header is not always necessary, and can be determined via reference to ARINC Specification 620-4, Appendix C per a label and sublabel basis. Therefore, in certain instances, it is expected that the ground will provide only the user-text as the ACARS message, and in other instances a partial A618 header will be appended to the user-text of the ACARS message. The example uplink message is formatted as follows:

.SFOMTUA
DFD
AN N1313Z
-#DF user-text

Decomposition Of Example A618 Message—Table 4 provides a decomposition of a partial A618 ACARS message with an optional populated header and an optional sublabel. Column 1, "Uplink ACARS Message Field," defines the field name in the ACARS message. Column 2, "Description," provides direction on how the information may be populated on the ground and whether such information is optional. The last column, "Example," maps the information back to the A618 ACARS message example. The CMU is expecting the ACARS message to be in this format.

TABLE 4

A620 Uplink ACARS Message Fields

| Uplink ACARS Message Field | Description | Example |
|---|---|---|
| Supplemental Address | Should include ground station origin name (optional header) | SFOMTUA |
| Transmission Time | Time ACARS message was sent from message processing server (optional header) | 182107 |
| Standard Message Identifier ("SMI") | This field is used to determine the label and optional sublabel in the Uplink-ACARS-MSG PDU (optional header) | DFD |
| Aircraft Registration Number TEI | Fixed (optional header) | AN |
| Aircraft Registration Number | Aircraft destination (optional header) | N1313Z |
| Separator | Fixed (optional header) | — |
| Sublabel | (optional) | #DF |
| User Text | Message payload to CMU | user-text |

A618 Uplink Messaging Protocol—The following is a high level composition of PDUs that can be generated by the ground end system and sent to the CMU on the aircraft.

TABLE 5

"Gate-Hello" PDU

Gate-Hello
Unique name of ground host

TABLE 6

"Uplink-ACARS-MSG" PDU

Uplink-ACARS-MSG
Label
Sub-Label
Text (All fields from Table 4)

In a practical embodiment, an ACK PDU sent by the ground end system for every PDU received from the CMU is not necessary due to a reliable transport system (i.e., the TCP/IP connection).

ASN.1 Notation

As mentioned above, ASN.1 is a formal notation used for describing data transmitted by protocols, regardless of language implementation and physical representation of the data. A practical advantage of using ASN.1 is the existence of freeware ASN.1 compilers. ASN.1 compilers convert ASN.1 text into C source code. The generated C code contains equivalent data structures and routines to convert values between the internal (C source code) representation and the corresponding Basic Encoding Rules format used to transmit data to a peer.

TCP is a stream oriented protocol, which means that there is no embedded distinction between the end of one PDU and the start of the next. Therefore, the given application must decipher the PDUs from the received octet stream. An ASN.1 encoded octet stream provides the distinction between PDUs by providing a size field in the first few octets of the stream. Thus, when reading an ASN.1 encoded PDU from a TCP/IP socket, the application must process the first few bytes to interpret the total size of the packet, then read the complete PDU prior to complete interpretation.

The following is ASN.1 text that describes one example ACARS messaging protocol as set forth above. The ASN.1 notation for a practical application will vary depending upon the data to exchange, new application protocols to support, and other implementation specific details.

```
ACARSOverInternetProtocol DEFINITIONS ::=
BEGIN
EXPORTS;
IMPORTS;
-- Basic types for AOIP protocol
VersionNumber ::=              [0] INTEGER
AircraftRegistrationNumber ::= [1] PrintableString( SIZE( 7 ) )
ICAOAddress ::=                [2] BIT STRING( SIZE( 24 ) )
FlightIdentifier ::=           [3] PrintableString( SIZE( 6 ) )
MessageSequenceNumber ::=      [4] PrintableString( SIZE( 4 ) )
TransmissionTime ::=           [5] NumericString( SIZE( 6 ) )
Label ::=                      [6] VisibleString( SIZE( 2 ) )
Sub-Label ::=                  [7] PrintableString( SIZE( 2 ) )
MessageText ::=                [8] OCTET STRING( SIZE( 3296 ) ) --
Supports BOP
GroundHost ::=                 [9] VisibleString( SIZE( 128 ) )
-----------------------------------------
-- Protocol
-----------------------------------------
-- Protocol used to implement AOIP
ACARSOverIP ::= [256] CHOICE
{
    downlink       AOIPDownlinks,
    uplink         AOIPUplinks
}
-----------------------------------------
-- Downlinks
-----------------------------------------
-- AirCraft-Hello PDU
AirCraftHello ::= [64] SEQUENCE
{
    version        VersionNumber,
    acid           AircraftRegistrationNumber,
    icaoaddr       ICAOAddress,
    EXTENSION
}
-- Downlink-ACARS-MSG PDU
DownlinkACARSMessage ::= [65] SEQUENCE
{
    flightid       FlightIdentifier,
    msn            MessageSequenceNumber,
```

-continued

```
    time            TransmissionTime,
    label           Label,
    sublabel        Sub-Label,
    text            MessageText,
    EXTENSION
}
-- Downlink Union
AOIPDownlinks ::= [128] CHOICE
{
    hellomsg        AirCraftHello,
    acarsmsg        DownlinkACARSMessage,
    EXTENSION
}
----------------------------------------
-- Uplinks
----------------------------------------
-- Ground Hello PDU
GroundHello ::= [66] SEQUENCE
{
    version         VersionNumber,
    name GroundHost,
    EXTENSION
}
-- Uplink-ACARS-MSG PDU
UplinkACARSMessage ::= [67] SEQUENCE
{
    label           Label,
    sublabel        Sub-Label,
    text            MessageText,
    EXTENSION
}
-- Uplink Union
AOIPUplinks ::= [129] CHOICE
{
    hellomsg        GroundHello,
    acarsmsg        UplinkACARSMessage,
    EXTENSION
}
END
```

Simulating ACARS Acknowledgments for Downlink Messages

When an ACARS messaging system according to a practical embodiment of the invention is utilized, the conventional ARINC/SITA network is bypassed during transmission. Consequently, the usual ACARS Network ACK (A618) is lost. External LRUs and internal CMU components, however, still expect to receive the A618 ACARS Network ACK to complete an ACARS transaction. This issue is further complicated if downlink ACARS messages are stored (queued) for future transmission as described above, or stored for transmission when the subnetwork is down. In particular, the following issues should be resolved: (1) when to simulate an ACARS Network ACK to external LRUs and signal CMU internal components; and (2) prevent rerouting of ACARS messages and extraneous ACARS Network ACKS.

Processing Of ACARS Downlink Messages—The following is a summary of how an ACARS downlink message can be processed by an example embodiment of the ACARS messaging system. This summary will provide background for the description of the simulated ACK functionality.

Step 1—The aircraft modifiable information ("AMI") will define the following new attribute for each downlink message type (determined by label) and for each originator (LRUs or CMU originated): GateLifetime. This attribute represents the number of time increments that the ACARS message may age on the CMU storage device, up to a maximum time. For example, GateLifetime may be the number of 30-minute increments, up to a maximum of 48 hours. In practice, the storage device is a mass storage memory device coupled to an appropriate card of the CMU. If 0 is defined, then the message should be sent immediately (no aging permitted). If this field is set to TIME_MAX, then the message should never be deleted (no aging occurs; the message will reside on the CMU storage device until sent to the ground message server). This field is different than the conventional Message Lifetime field in the AMI.

Step 2—For each downlink message, the ACARS routing function will perform the following:

(a) Use the Subnetwork preference byte and Subnetwork_Available flag to determine if the message can be transferred via the TCP/IP datalink. The Subnetwork_Available flag is reported to the ACARS routing function by the ACARS messaging function when the ability to transfer ACARS messages to the ground becomes available, and when the ability is lost.

(b) Determine how long the ACARS message should age. This should be calculated from the GateLifetime and Message Lifetime parameters from the AMI. The determination may simply select the shortest of these two lifetime values.

Step 3—The ACARS messaging function will perform the following:

(a) Receive downlink ACARS messages from the ACARS routing function when the subnetwork is not available. If the given lifetime parameter is greater than zero, then the message is stored on the CMU storage device according to a given priority scheme.

If the given lifetime parameter is zero, then the ACARS routing function is notified that the ACARS downlink message can't be sent.

(b) Receive downlink ACARS messages from the ACARS routing function when the subnetwork is available. As soon as the subnetwork becomes available, the ACARS router begins downloading of any ACARS messages on the storage device to the ground system in priority order. If any received ACARS message from the ACARS routing function is of higher priority than all stored messages, then the ACARS message from the ACARS routing function is transmitted next. If any received ACARS message from the ACARS routing function is of lower priority than any stored message, then store that message and continue transmitting higher priority messages from the storage device over the TCP/IP datalink. If the subnetwork becomes unavailable, then check the lifetime of each stored message. If the lifetime equals zero (or has expired) for a given ACARS downlink message, than discard the message.

Goals/Requirements For Simulating ACARS Network ACKs—The following should be considered in the practical implementation of an ACARS messaging system as described herein.

1. Simulate ACARS Network ACKs to allow external LRUs and internal CMU components to send more than one ACARS message at a time.

2. If the GateLifetime attribute is zero, than do not simulate an ACARS Network ACK until the message is actually received by the ground server.

3. If the subnetwork is up, then send the ACARS message immediately and simulate an ACARS Network ACK.

4. If unable to transmit the ACARS message (e.g., the subnetwork is down) and the GateLifetime attribute is zero, then discard the ACARS message and return an ACARS NAK to the ACARS router. This scenario will allow the ACARS router to re-route the ACARS message, if so desired.

5. If unable to transmit the ACARS message (e.g., the subnetwork is down) and the GateLifetime attribute is greater than zero, then simulate an ACARS Network ACK immediately and store the ACARS message on the storage device for later transmission.

6. If unable to transmit ACARS message (e.g., the subnetwork is down) and the GateLifetime attribute is greater than zero, then delete the ACARS message when the GateLifetime attribute expires. This prevents rerouting and multiple extraneous ACARS Network ACKS.

Use Cases For Simulating ACARS Network ACKs—This section provides Use Cases per our the stated goals and requirements. The following defines the participants:

1. External LRU—LRU separate from the CMU; communicates over 429/A619.

2. ACARS Stack—ACARS implementation residing on the CMU.

3. AM—ACARS Messaging function; resides on the CMU and communicates over TCP/IP.

4. Message Server—Ground server, which is the AM peer; connected to TCP/IP network.

Note that even though all of these use cases define the interaction with an external LRU, any CMU originated ACARS messages will behave in the same manner. In this regard, simply replace the External CMU participant with any internal CMU participant and the use cases still perform the same.

Figure 7:
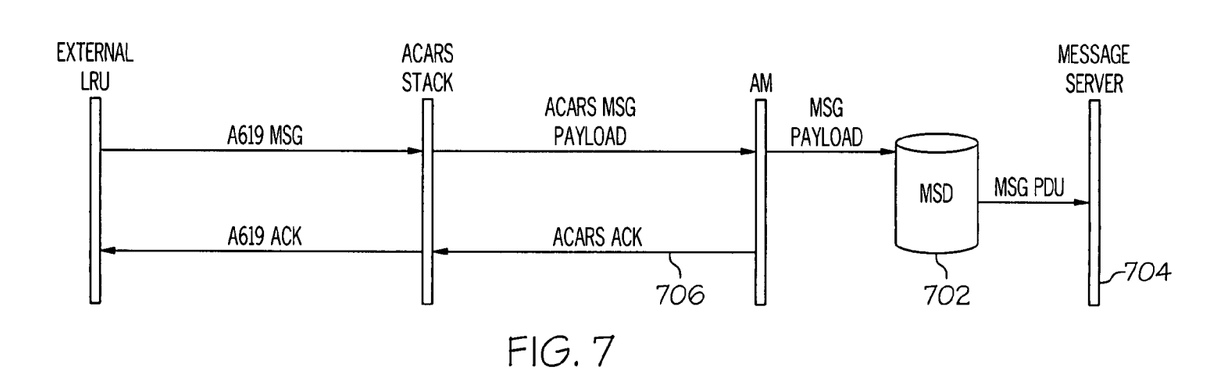
FIG. 7 is a message sequence diagram that illustrates a simulated acknowledgment procedure.

Case 1: Successful Downlink, Simulated ACK—FIG. 7 is a message sequence diagram that illustrates a simulated ACK procedure. This scenario assumes the following preconditions: (1) the subnetwork is up; and (2) the GateLifetime attribute="Don't Care." Since the subnetwork is up, the GateLifetime parameter is irrelevant. In this example, the ACARS message traverses through the mass storage device ("MSD") 702 of the CMU for priority processing. As soon as the ACARS message is actually sent to the ground message server 704, an "ACARS ACK" is simulated.

Figure 8:
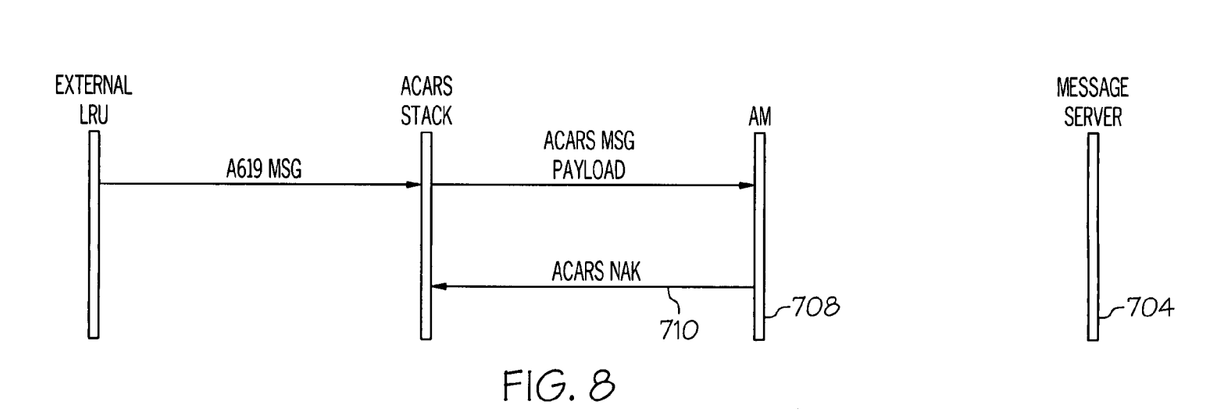
FIG. 8 is a message sequence diagram that illustrates a procedure related to ACARS message re-routing.

Case 2: ACARS Message Return For Re-Routing—FIG. 8 is a message sequence diagram that illustrates this scenario. This scenario assumes the following preconditions: (1) the subnetwork is down; and (2) the GateLifetime attribute is zero (send immediately). Since the subnetwork is down and the GateLifetime attribute is zero, the ACARS messaging function 708 returns an "ACARS NAK" message 710 immediately to the ACARS router. No simulated "ACARS ACK" is necessary at this time. The message could be re-routed to another subnetwork (SATCOM, VHF, etc.) where a conventional ACARS Network ACK would be expected.

Figure 9:
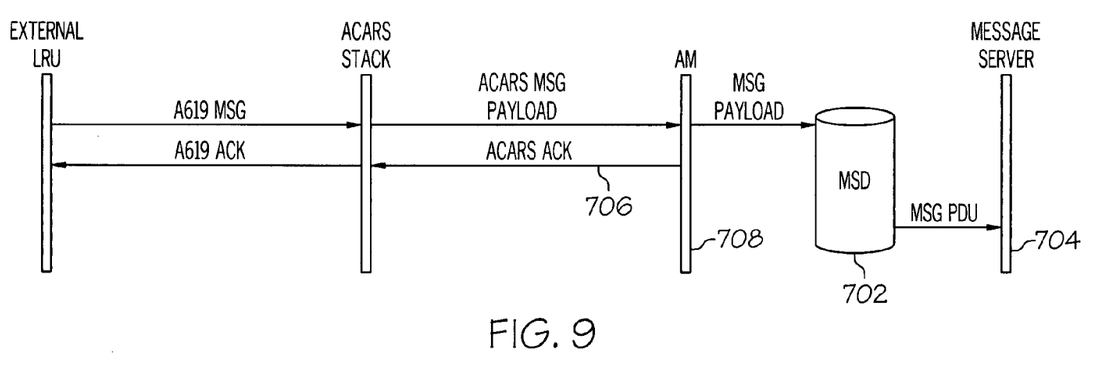
FIG. 9 is a message sequence diagram that illustrates a simulated acknowledgment corresponding to a delayed downlink message.

Case 3: Successful Delayed Downlink, Simulated ACK—FIG. 9 is a message sequence diagram that illustrates this scenario. The following preconditions apply to this case: (1) the subnetwork is down; and (2) the GateLifetime attribute is greater than zero (store the message on MSD 702 if the subnetwork is unavailable). Since the GateLifetime attribute is greater than zero, the system simulates an ACARS Network ACK 706 immediately and there is no need to wait for successful transmission of the ACARS Message. The stored ACARS message is successfully transmitted at a later time, but prior to the expiration of the GateLifetime parameter.

Figure 10:
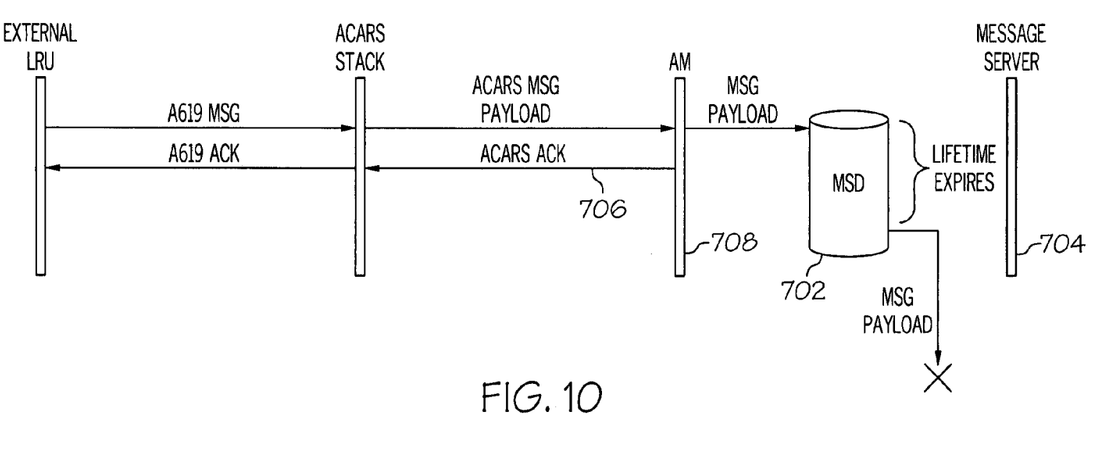
FIG. 10 is a message sequence diagram that illustrates a simulated acknowledgment corresponding to an unsuccessful downlink message.

Case 4: Unsuccessful Downlink, Simulated ACK—FIG. 10 is a message sequence diagram that illustrates this scenario. The following preconditions apply to this case: (1) the subnetwork is down; (2) the GateLifetime attribute is greater than zero (store the message on MSD 702 if the subnetwork is unavailable); and (3) the subnetwork does not resurrect within the period defined by the GateLifetime attribute. Since the GateLifetime attribute is greater than zero, the system simulates an ACARS Network ACK 706 immediately and there is no need to wait for successful transmission of the ACARS Message. Assuming that the GateLifetime parameter has expired, the ACARS message gets deleted from MSD 702. In this case, the ACARS message is not delivered to message server 704, and other measures can be taken to ensure transmission of the message.

Processing for the ACARS Router

The following implementation notes refer to one practical embodiment of the ACARS message system described herein. Of course, an actual implementation of the system can vary according to the needs and requirements of the particular deployment.

Downlink ACARS Messages:

1. Messages will be deemed worthy of subnetwork transmission by some internal method.

2. A619 processing will occur on the ACARS router prior to the message being transferred for further processing. Such further processing may include, for example, A619 header stripping and A619 application ACKs.

3. ACARS messages will not be segmented.

4. If appropriate, ACARS messages can be encrypted prior to ACARS router processing.

5. Subnetwork worthy messages should be processed and sent immediately. Queuing is not necessary and immediate transfer to the storage device is performed. Queuing is maintained on the storage device coupled to the ACARS router. Since the storage device functions as a hard disk for storage of subnetwork-bound ACARS messages, power transients or other power disruptions will not result in loss of these ACARS messages.

6. The parameters of a downlink ACARS message to be transferred include: user-text, label, sublabel, message sequence number, and Flight Identifier. It is assumed that the user-text parameter may be encrypted, but the other parameters will not be encrypted.

Uplink ACARS Messages:

1. For a message destined to an airborne end system (e.g., the flight management system), A619 processing can occur after the message has been received by the ACARS router. Such processing may include, for example, appending an A619 header and receiving A619 application ACKs.

2. ACARS messages will not be received in segmented form (in multiple blocks). If the true destination is an LRU over Character Oriented Protocol 429 and the message text is greater than 220 octets (one block), then some post-processing will need to be performed to manipulate the message text into appropriate sized blocks. The "post-processing" may be performed by any suitable processing element of the ACARS router, and the location of such processing is an implementation decision.

3. ACARS messages may be received in encrypted form. If encrypted, the messages will be decrypted by the ACARS router.

4. The parameters of an uplink ACARS message to be transferred to the ACARS router include: user-text, label, and sublabel. It is assumed that the user-text parameter may be encrypted, but the other parameters will not be encrypted.

5. Any message received from the ground system via the subnetwork will not require an A618 ACARS ACK due to the bypassing of the airborne ACARS stack and the ground-based data service provider.

Processing for the Message Processing Ground Server

1. The message processing server should support one TCP/IP connection per aircraft.

2. The aircraft will initiate the TCP/IP connection to the message processing server when the subnetwork is available.

3. The message processing server will support multiple TCP/IP connections (dependent on the number of aircraft at airport gates at any one time).

4. The message processing server will to exercise the ACARS messaging protocol as set forth in more detail above.

5. The message processing server will populate and interpret the PDUs as described in more detail above.

6. If appropriate, the message processing server will perform encryption and decryption processing of the text field. Other fields need not be encrypted.

7. The message text will not be segmented. The CMU can support a text field up to 3296 octets (per ARINC 619) for use with Bit Oriented Protocol.

8. The text field of a Downlink-ACARS-MSG PDU may contain multiple supplemental addresses. The message processing server will either distribute these messages as appropriate, or disallow messages with more than one supplemental address.

9. Downlink ACARS messages with label QA through QT depend on the ARINC/SITA data service provider to provide certain formatting of the messages prior to delivery to the destination. Since the ACARS messaging system described herein does not rely on a data service provider when the subnetwork is used, the message processing server will provide this same type of formatting. The message processing server will determine whether this formatting is appropriate; if not, it will forgo the extra processing and simply alert the end user that the text will be seen in its raw format.

10. The message processing server will need to manage lost connections to the aircraft (either graceful disconnects, or TCP/IP connection timeouts).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An ACARS messaging method comprising:
   obtaining an ACARS message containing message content;
   encoding said ACARS message into an ASN.1 compliant message containing said message content;
   translating said ASN.1 compliant message into an ACARS-IP message containing said message content, said ACARS-IP message being compliant with the TCP/IP suite of protocols; and
   transmitting said ACARS-IP message between an aircraft and a message processing server via a TCP/IP datalink.

2. A method according to claim 1, wherein said ACARS-IP message is a downlink message.

3. A method according to claim 1, further comprising:
   prioritizing in-flight ACARS downlink messages; and
   queuing, in response to said prioritizing step, one or more of said in-flight ACARS downlink messages for transmission as one or more ACARS-IP downlink messages.

4. A method according to claim 1, wherein said ACARS-IP message is an uplink message.

5. A method according to claim 1, wherein said transmitting step transmits said ACARS-IP message via at least one wireless TCP/IP datalink.

6. A method according to claim 1, wherein said transmitting step transmits said ACARS-IP message via the Internet.

7. A method according to claim 1, wherein transmitting said ACARS-IP message occurs after touchdown of said aircraft.

8. A method according to claim 1, further comprising establishing said TCP/IP datalink.

9. An ACARS messaging system comprising:
   means for obtaining an ACARS message containing message content;
   means for encoding said ACARS message into an ASN.1 compliant message containing said message content;
   means for translating said ASN.1 compliant message into an ACARS-IP message containing said message content, said ACARS-IP message being compliant with the TCP/IP suite of protocols; and
   means for transmitting said ACARS-IP message between an aircraft and a message processing server via a TCP/IP datalink.

10. A system according to claim 9, wherein said TCP/IP datalink comprises at least one wireless TCP/IP datalink.

11. A method according to claim 9, further comprising:
   means for prioritizing in-flight ACARS downlink messages to obtain prioritized messages; and
   means for queuing said prioritized messages for transmission as one or more ACARS-IP downlink messages.

12. A downlink ACARS messaging method comprising:
   establishing a TCP/IP datalink between an aircraft and a message processing server;
   encoding a handshake message containing an aircraft registration number for said aircraft into an ASN.1 compliant handshake message containing said aircraft registration number;
   translating said ASN.1 compliant handshake message into an ACARS-IP handshake message containing said aircraft registration number, said ACARS-IP handshake message being compliant with the TCP/IP suite of protocols; and
   transmitting said ACARS-IP handshake message to said message processing server via said TCP/IP datalink.

13. A method according to claim 12, wherein said ACARS-IP handshake message is generated in response to an ACARS message containing message content, said message content comprising said aircraft registration number.

14. A method according to claim 12, further comprising:
   generating an ACARS-IP downlink message containing a message payload, said ACARS-IP downlink message being compliant with the TCP/IP suite of protocols; and
   transmitting said ACARS-IP downlink message to said message processing server via said TCP/IP datalink.

15. A method according to claim 14, wherein said ACARS-IP downlink message is generated in response to an ACARS message containing message content, said message content comprising said message payload.

16. A method according to claim 14, wherein said message payload comprises one or more of the following: a flight identifier; a message sequence number; a transmission time indicator; an alphanumeric text message; and a standard message identifier label.

17. A method according to claim 14, wherein said ACARS-IP downlink message is generated in response to an ASN.1 encoded ACARS message containing message content, said message content comprising said message payload.

18. A method according to claim 12, further comprising obtaining an IP address for said message processing server prior to establishing said TCP/IP datalink.

19. A method according to claim 12, wherein establishing said TCP/IP datalink occurs after touchdown of said aircraft.

20. An uplink ACARS messaging method comprising:
establishing a TCP/IP datalink between an aircraft and a message processing server;
encoding a handshake message containing an identifier for said message processing server into an ASN.1 compliant handshake message containing said identifier;
translating said ASN.1 compliant handshake message into an ACARS-IP handshake message containing said identifier, said ACARS-IP handshake message being compliant with the TCP/IP suite of protocols; and
transmitting said ACARS-IP handshake message to said aircraft via said TCP/IP datalink.

21. A method according to claim 20, further comprising:
generating an ACARS-IP uplink message containing a message payload, said ACARS-IP uplink message being compliant with the TCP/IP suite of protocols; and
transmitting said ACARS-IP uplink message to said aircraft via said TCP/IP datalink.

22. A method according to claim 21, wherein said ACARS-IP uplink message is generated in response to an ACARS message containing message content, said message content comprising said message payload.

23. A method according to claim 21, wherein said message payload comprises one or more of the following: a supplemental address; a transmission time indicator; a standard message identifier label; an aircraft registration number for said aircraft; and an alphanumeric text message.

24. A method according to claim 21, wherein said ACARS-IP uplink message is generated in response to an ASN.1 encoded ACARS message containing message content, said message content comprising said message payload.

25. A method according to claim 20, further comprising obtaining an IP address for said aircraft prior to establishing said TCP/IP datalink.

26. A method according to claim 20, wherein establishing said TCP/IP datalink occurs after touchdown of said aircraft.

27. An ACARS messaging method comprising:
establishing a TCP/IP datalink between an aircraft and a message processing server;
obtaining an ACARS message containing message content;
encoding said ACARS message into an ASN.1 compliant message containing said message content;
translating said ASN.1 compliant message into an ACARS-IP message containing said message content, said ACARS-IP message being compliant with the TCP/IP suite of protocols;
transmitting said ACARS-IP message via said TCP/IP datalink;
receiving said ACARS-IP message to obtain a received ACARS-IP message; and
extracting said message content from said received ACARS-IP message.

28. A method according to claim 27, further comprising constructing a received ACARS message in response to said received ACARS-IP message.

29. A method according to claim 28, wherein constructing a received ACARS message comprises performing ASN.1 decoding on said received ACARS-IP message.

30. A method according to claim 27, wherein said transmitting step transmits said ACARS-IP message via at least one wireless TCP/IP datalink.

31. A method according to claim 27, wherein said transmitting step transmits said ACARS-IP message via the Internet.

32. A method according to claim 27, wherein transmitting said ACARS-IP message occurs after touchdown of said aircraft.

33. An ACARS messaging system for an aircraft, said system comprising:
a ACARS router;
an onboard data communication element for said ACARS router, said data communication element being configured to establish a TCP/IP datalink between said aircraft and a message processing server;
said ACARS router being configured to encode an ACARS message into an ASN.1 compliant message containing message content and to translate said ASN.1 compliant message into an ACARS-IP message containing said message content, said ACARS-IP message being compliant with the TCP/IP suite of protocols; and
said data communication element being configured to transmit said ACARS-IP message between said aircraft and said message processing server via said TCP/IP datalink.

34. A system according to claim 33, wherein said data communication element is configured to transmit said ACARS-IP message via at least one wireless TCP/IP datalink.

35. A system according to claim 33, wherein said data communication element comprises a terminal area wireless LAN unit.

36. A system according to claim 33, wherein said ACARS router is further configured to:
prioritize in-flight ACARS downlink messages to obtain prioritized messages; and
queue said prioritized messages for transmission as one or more ACARS-IP downlink messages.

37. A system according to claim 33, wherein said data communication element transmits said ACARS-IP message via the Internet.

* * * * *